United States Patent [19]

Iwata

[11] Patent Number: 5,249,299
[45] Date of Patent: Sep. 28, 1993

[54] INFORMATION PROCESSING SYSTEM HAVING DIAGNOSTIC PROCESSOR FOR DETECTING FAILURES IN THE DIAGNOSTIC PROCESSOR ITSELF AND PERFORMING RETRIES UPON FAILURE DETECTION

[75] Inventor: Jun Iwata, Tokyo, Japan

[73] Assignee: NEC Corporation, Tokyo, Japan

[21] Appl. No.: 539,822

[22] Filed: Jun. 19, 1990

[30] Foreign Application Priority Data

Jun. 19, 1989 [JP] Japan .................. 1-154727

[51] Int. Cl.⁵ .................. G06F 11/30; G06F 11/00
[52] U.S. Cl. .................. 395/800; 395/575;
371/12; 371/15.1; 364/266; 364/267;
364/DIG. 1; 364/944.9; 364/945.1
[58] Field of Search .......... 395/800, 575; 371/12, 371/15.1

[56] References Cited

U.S. PATENT DOCUMENTS

| | | | |
|---|---|---|---|
| 4,392,208 | 7/1983 | Burrows et al. | 395/575 |
| 4,443,849 | 4/1984 | Ohwada | 395/575 |
| 4,703,446 | 10/1987 | Momose | 364/580 |
| 4,845,614 | 7/1989 | Hanawa et al. | 395/275 |

Primary Examiner—Robert B. Harrell
Assistant Examiner—Paul Harrity
Attorney, Agent, or Firm—Foley & Lardner

[57] ABSTRACT

In an information processing system comprising a diagnosing unit (15) for carrying out, in response to an activation signal (17), a diagnosing operation for a main memory (10), a standard processor (11 or 12), and a system controller (13), a state indication area (20) stores a state signal which is produced by a monitoring unit (18) monitoring the diagnosing unit to indicate whether the diagnosing operation is possible and impossible and which, when the diagnosing operation is impossible, makes a diagnosis control unit (19) control retry of the diagnosing operation. Through a request controller (27) operable as a read request supply unit, the state signal is read by a read request signal produced by a signal producing unit (21) to make a judging unit (29) make a delivery control unit (24) allow and inhibit, when the diagnosing operation is possible and impossible, delivery as the activation signal of a communication signal produced by the signal producing unit through a communication controller (25) operable as a communication request supply unit. The state signal is stored in the state indication area by a write request signal produced by the signal producing unit and sent through the request controller which is now operable as a write request controller.

4 Claims, 4 Drawing Sheets

INFORMATION PROCESSING SYSTEM HAVING DIAGNOSTIC PROCESSOR FOR DETECTING FAILURES IN THE DIAGNOSTIC PROCESSOR ITSELF AND PERFORMING RETRIES UPON FAILURE DETECTION

BACKGROUND OF THE INVENTION:

This invention relates to an information processing system comprising a main memory, at least one standard processor, a system controller, and a diagnostic processor. The standard processor is, for example, a control processor, an arithmetic processor, or the like.

In an information processing system of the type described, the diagnostic processor comprises a diagnosing unit connected to the main memory, the standard processor, and the system controller. The diagnosing unit carries out a diagnosing operation on the main memory, the standard processor, and the system controller in response to an activation signal. Connected to the diagnosing unit, a monitoring unit detects a failure in the diagnosing unit, namely, it monitors the diagnosing unit to produce a state signal indicative of whether or not the diagnosing unit can carry out the diagnosing operation. Connected to the diagnosing unit and the monitoring unit, a diagnosis control unit carries out a controlling operation for restart or retry of the diagnosing operation in response to the state signal when the state signal indicates that the diagnosing unit can not deal with the diagnosing operation. Such a controlling operation of retry for the diagnosing operation will later be described.

It will be assumed that the information processing system comprises first and second standard processors. Each of the first and the second standard processors can put the diagnosing unit into a normal state of carrying out the diagnosing operation by sending, as the activation signal, a communication request signal to the diagnosing unit through the system controller. For example, the communication request signal is sent to inform the diagnosing unit that a failure has occurred in the standard processor in question. Alternatively, the communication request signal is sent to make a request for a log-out which is known in the art. It will also be assumed that the diagnosing unit is put in the normal state by a first communication request signal sent by the first standard processor and that the monitoring unit finds a failure to put the diagnosis control unit into the controlling operation for retry of the diagnosing operation. In this event, the diagnosing unit is temporarily put in an interrupted state for interrupting the diagnosing operation.

It will furthermore be assumed that the second standard processor sends, as the activation signal, a second communication request signal to the diagnosing unit through the system controller while the diagnosing unit is kept in the interrupted state.

In a conventional information processing system, the system controller reserves, in such a case, the second communication request without delivering the second communication request signal from the system controller to the diagnostic processor until the diagnosing operation is fully retried. In many cases, the second standard processor can not receive a reply communication signal from the diagnosing unit through the system controller within a predetermined time duration after the second communication request signal is sent to the system controller. Therefore, the second standard processor is subjected to a time-out error. This puts the information processing system into a system down state.

SUMMARY OF THE INVENTION

It is therefore an object of this invention to provide an information processing system which is not subjected to a system down state even when a diagnostic processor carries out retry of a diagnosing operation thereof.

It is another object of this invention to provide an information processing system of the type described, which is capable of effectively making use of a time-out error occurring in a standard processor when a diagnostic processor carries out retry of a diagnosing operation thereof.

On describing the gist of this invention, it is possible to understand that an information processing system comprises a main memory, a standard processor, a system controller, and a diagnostic processor comprising: diagnosing means connected to the main memory, the standard processor, and the system controller for carrying out a diagnosing operation on the main memory, the standard processor, and the system controller in response to an activation signal; monitoring means connected to the diagnosing means for monitoring the diagnosing means for detecting failure in the diagnosing means, when the monitoring means does not detect failure, for producing a state signal indicating that the diagnosing means is capable of carrying out a diagnosing operation and when the monitoring means detects failure for making the state signal indicate that the diagnosing means is incapable of carrying out a diagnosing operation; and diagnosis control means connected to the diagnosing means and the monitoring means for controlling retry of the diagnosing operation in response to the state signal indicating that the diagnosing means is not capable of carrying out the diagnosing operation.

According to this invention, the main memory comprises, in the above-understood information processing system, a state indication area connected to the monitoring means for storing the state signal as a state indication signal. The standard processor comprises: signal producing means for producing a communication request signal and a read request signal; and delivery control means connected to the signal producing means for receiving the communication request signal and for controlling delivery of the communication request signal from the delivery control means. The system controller comprises: communication request supply means connected to the diagnosing means and the delivery control means for supplying to the diagnosing means as the activation signal the communication request signal delivered from the delivery control means to the diagnosing means as the activation signal; and read request supply means connected to the state indication area and the signal producing means for supplying the state indication area with the read request signal for receiving the state indication signal as a read-out state signal. The standard processor further comprises judging means connected to the delivery control means and the read request supply means for judging the read-out state signal to produce first and second control signals when the diagnosing means is and is not capable of carrying out the diagnosing operation, respectively. The judging means sends the first and the second control signals to the delivery control means to allow and inhibit delivery, respectively, of the communication request signal from the delivery control means to the communication request supply means.

Figure 1:
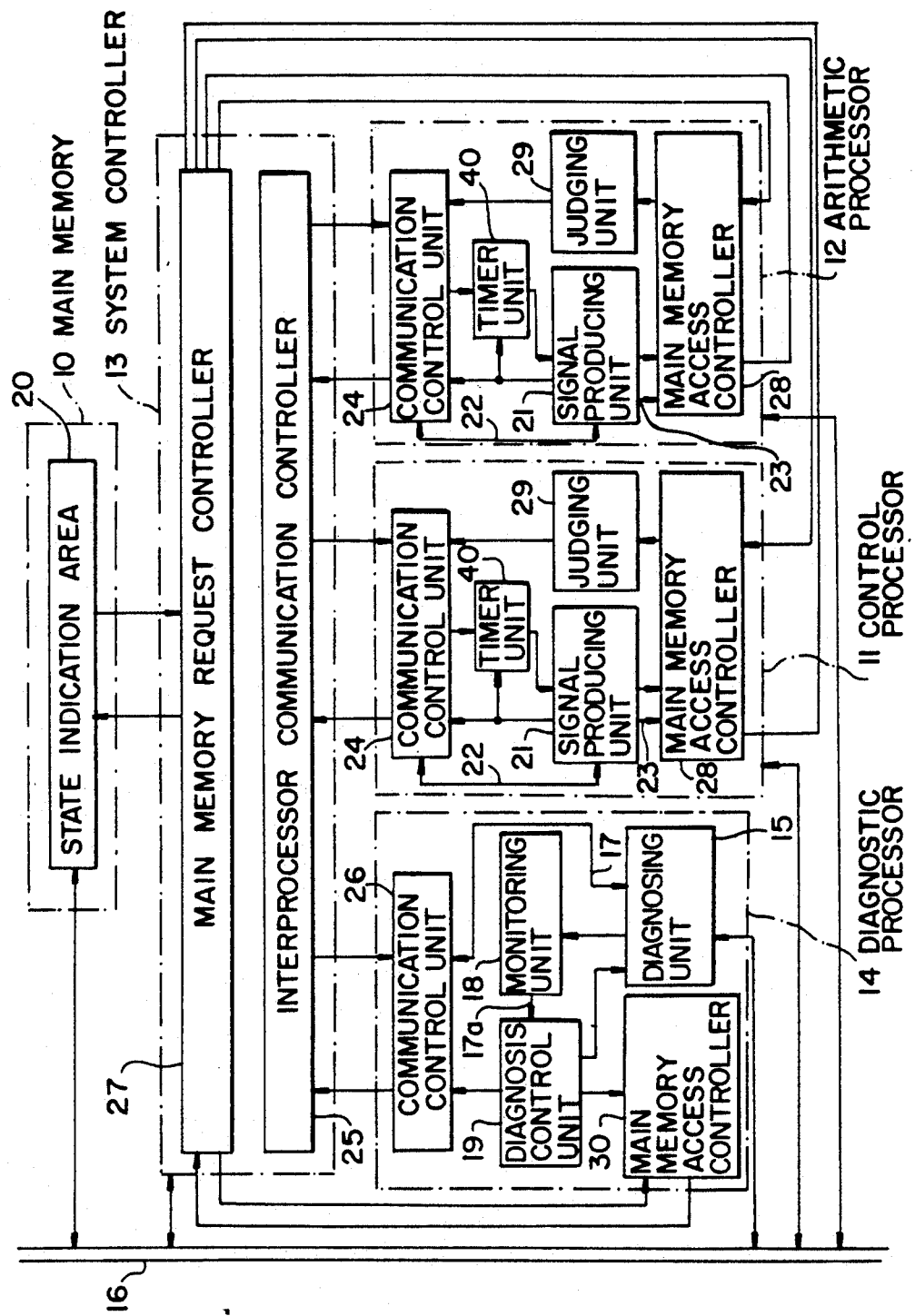
FIG. 1 is a block diagram of an information processing system according to an embodiment of this invention.

DESCRIPTION OF THE PREFERRED EMBODIMENT:

Referring to FIG. 1, an information processing system according to a preferred embodiment of this invention comprises a main memory 10, a control processor 11, an arithmetic processor 12, a system controller 13, and a diagnostic processor 14. Each of the control and the arithmetic processors 11 and 12 is herein referred to as a standard processor.

The diagnostic processor 14 comprises a diagnosing unit 15 which is connected to the main memory 10, the control processor 11, the arithmetic processor 12, and the system controller 13 through a diagnostic bus 16. In response to an activation signal 17 which will later be described, the diagnosing unit 15 carries out a diagnosing operation on the main memory 10, the control processor 11, the arithmetic processor 12, and the system controller 13. Connected to the diagnosing unit 15, a monitoring unit 18 monitors the diagnosing unit 15 and produces a state signal 17a indicative of whether or not the diagnosing unit 15 is capable of carrying out the diagnosing operation. More specifically, when the monitoring unit 18 detects a failure in the diagnosing unit 15, the monitoring unit 18 produces the state signal 17a indicating that the diagnosing unit 15 is not capable of carrying out the diagnosing operation. Connected to the diagnosing unit 15 and the monitoring unit 18, a diagnosis control unit 19 controls or restart of the diagnosing operation in response to the state signal 17a indicating that the diagnosing unit 15 is not capable of carrying out the diagnosing operation.

More specifically, the retry of the diagnosing operation is carried out as follows. The diagnostic control unit 19 saves data indispensable for the retry of the diagnosing unit 15 in a save area (not shown) as saved data at first. Subsequently, initialization is carried out for the diagnosing unit 15. Thereafter, restart of the diagnosing unit 15 is carried out. When the diagnosing unit 15 is thereby put into a state in which the retry can be made, the retry is actually carried out by using the saved data.

The main memory 10 comprises a state indication area 20 connected to the monitoring unit 18 in the manner which will become clear as the description proceeds. The state indication area 20 stores the state signal as a state indication signal.

The control processor 11 comprises a signal producing unit 21 which produces a communication request signal 22 and a read request signal 23. Connected to the signal producing unit 21, a communication control unit 24 of the control processor 11 receives the communication request signal 22 and controls delivery of the communication request signal 22 outwardly from the communication control unit 24. Thus, the communication control unit 24 of the control processor 11 serves as a delivery control unit. Connected to the signal producing unit 21, the delivery control unit controls delivery of the communication request signal 22 from the delivery control unit.

The system controller 13 comprises an interprocessor communication controller 25 which is connected to the diagnosing unit 15 through a communication control unit 26 of the diagnostic processor 14 and is connected to the communication control unit 24 of the control processor 11 directly. The interprocessor communication controller 25 supplies the communication request signal 22 delivered from the communication control unit 24 of the control processor 11 to the diagnosing unit 15 as the activation signal 17. Thus, the interprocessor communication controller 25 serves as a communication request supply unit connected to the diagnosing unit 15 for supplying the communication request signal 22 delivered from the communication control unit 24 to the diagnosing unit 15 as the activation signal 17.

Connected to the state indication area 20 directly and to the signal producing unit 21 through a main memory access controller 28 of the control processor 11, a main memory request controller 27 supplies the read request signal 23 to the state indication area 20 to receive the state indication signal as a read-out state signal through the main memory access controller 28. Thus, the main memory request controller 27 acts as a read request supply unit which supplies the state indication area 20 with the read request signal 23 to receive the state indication signal as the read-out state signal.

The control processor 11 further comprises a judging unit 29 which is connected to the communication control unit 24 of the control processor 11 directly and to the main memory request controller 27. The judging unit 29 judges the read-out state signal and produces first and second control signals when the read-out state signal indicates that the diagnosing unit 15 is and is not capable of carrying out the diagnosing operation, respectively. The judging unit 29 sends the first and the second control signals to the communication control unit 24 of the control processor 11 to allow and inhibit the delivery of the communication request signal 22 to the interprocessor communication controller 25, respectively.

The arithmetic processor 12 is similar in structure and in operation to the control processor 11.

Figure 2:
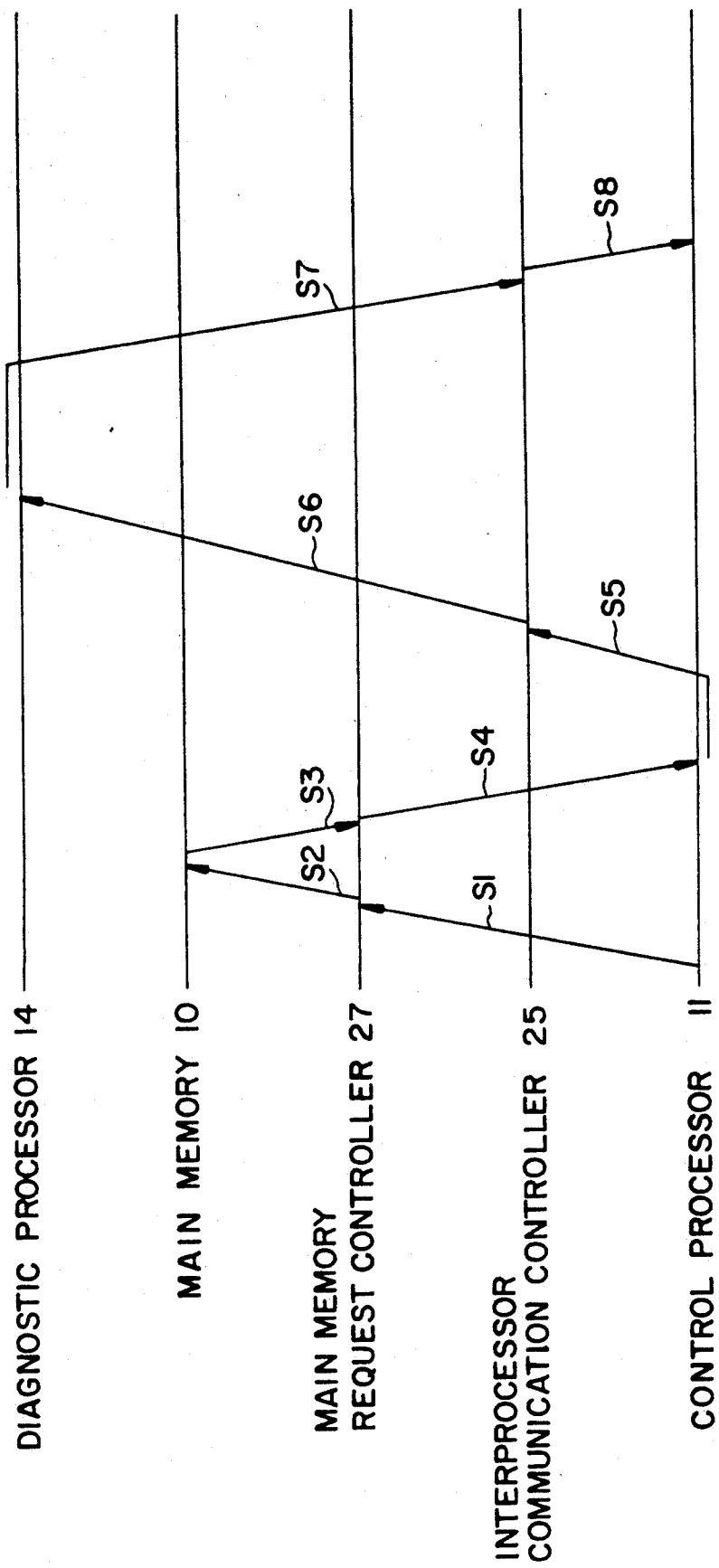
FIG. 2 is a time chart for use in describing operation of the information processing system illustrated in FIG. 1.

Turning to FIG. 2 with reference to FIG. 1 continued, a description will be made as regards operation of the information processing system illustrated in FIG. 1. Although the description will now be made only about an interprocessor communication operation from the control processor 11 to the diagnostic processor 14, another interprocessor communication operation from the arithmetic processor 12 to the diagnostic processor 14 is carried out in a manner similar to the interprocessor communication operation from the control processor 11 to the diagnostic processor 14.

It will be assumed that the signal producing unit 21 of the control processor 11 produces the communication request signal 22 and the read request signal 23 and that the communication control unit 24 of the control processor 11 receives the communication request signal 22 and controls delivery of the communication request signal 22 from the communication control unit 24.

At a first stage S1, the main memory access controller 28 of the control processor 11 receives the read request signal 23 and sends the read request signal 23 to the main memory request controller 27. The first stage S1 proceeds to a second stage S2.

At the second stage S2, the memory request controller 27 receives the read request signal 23 and supplies the state indication area 20 of the main memory 10 with the read request signal 23. The second stage S2 is succeeded by a third stage S3.

At the third stage S3, the state indication area 20 of the main memory 10 receives the read request signal 23 and sends the state indication signal to the main memory request controller 27. For example, the state indication area 20 has one byte length. When the state indication signal has a hexadecimal value "00", the state indication signal indicates that the diagnosing unit 15 is capable of carrying out the diagnosing operation. When the state indication signal has another hexadecimal value "FF", the state indication signal indicates that the diagnosing unit 15 is not capable of carrying out the diagnosing operation. The third stage S3 is followed by a fourth stage S4.

At the fourth stage S4, the main memory request controller 27 receives the state indication signal as a read-out state signal and sends the read-out state signal to the judging unit 29 through the main memory access controller 28 of the control processor 11. The fourth stage S4 is succeeded by a fifth stage S5.

At the fifth stage S5, the judging unit 29 judges the read-out state signal and produces the first and the second control signals when the read-out state signal indicates that the diagnosing unit 15 is and is not capable of carrying out the diagnosing operation, respectively. More specifically, the judging unit 29 produces the first and the second control signals when the read-out state signal has the hexadecimal values "00" and "FF", respectively.

The judging unit 29 sends the first and the second control signals to the communication control unit 24 of the control processor 11 to allow and inhibit the delivery of the communication request signal 22 to the interprocessor communication controller 25, respectively. That is, the communication control unit 24 delivers the communication request signal 22 to the interprocessor communication controller 25 when the communication control unit 24 receives the first control signal. When the communication control unit 24 receives the second control signal, the communication control unit 24 reserves the communication request signal 22 without delivering the communication request signal 22 from the communication control unit 24 to the interprocessor communication controller 25.

At a sixth stage S6 which follows the fifth stage S5, the interprocessor communication controller 25 receives the communication request signal 22 and supplies the communication request signal 22 to the diagnosing unit 15 through the communication control unit 26 of the diagnosing processor 14 as the activation signal 17.

A seventh stage S7 follows the sixth stage S6. At the seventh stage S7, the diagnosing unit 15 carries out the diagnosing operation in response to the activation signal 17. More specifically, the diagnosing unit 15 decodes the communication request signal 22 into a decoded signal which specifies a specific one of a plurality of diagnosing programs. Thereafter, the diagnosing unit 15 carries out a specific diagnosing operation in accordance with the specific program. When the diagnosing unit 15 finishes the specific diagnosing operation, the diagnosing unit 15 produces a reply communication signal as an end report of the specific diagnosing operation. The diagnosing unit 15 sends the reply communication signal to the interprocessor communication controller 25 through the communication control unit 26 of the diagnostic processor 14.

At an eighth stage S8 which follows the seventh stage S7, the interprocessor communication controller 25 receives the reply communication signal and sends the reply communication signal to the communication control unit 24 of the control processor 11.

Figure 3:
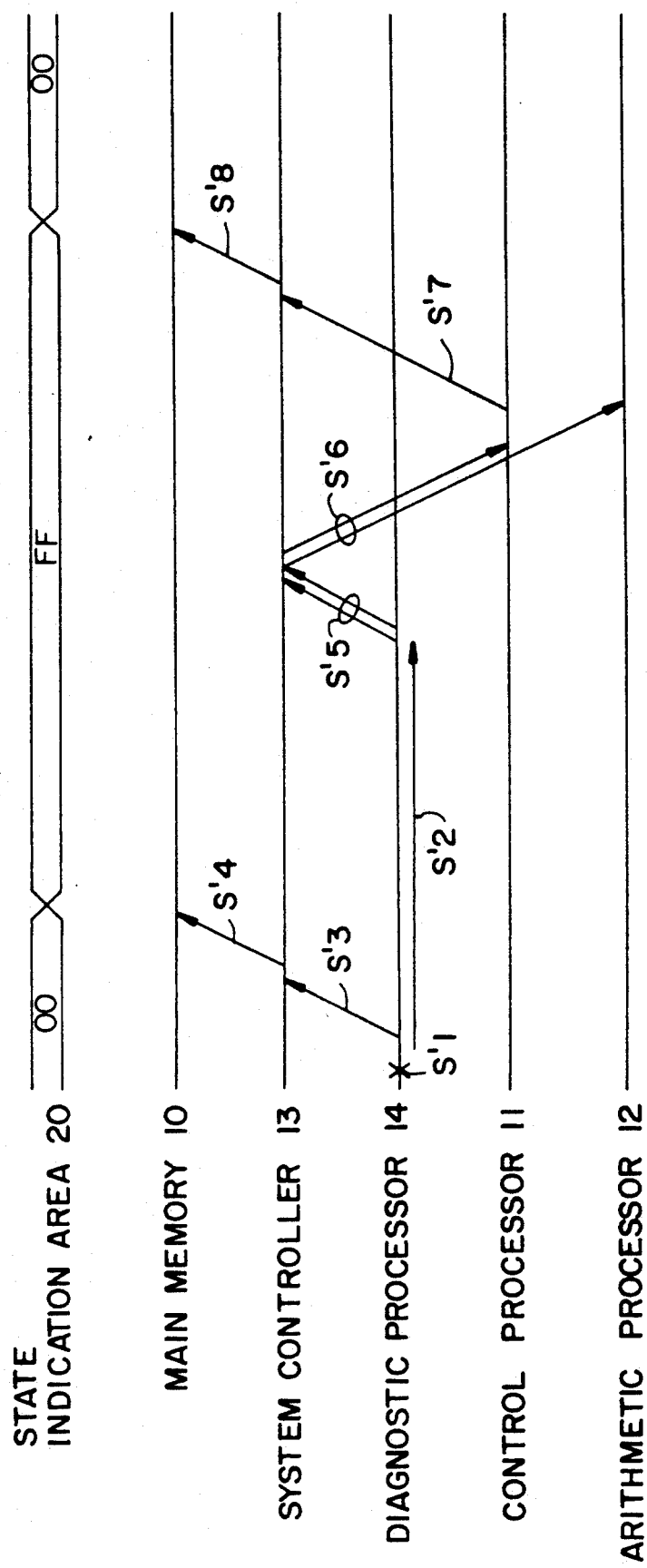
FIG. 3 is another time chart for use in describing another operation of the information processing system illustrated in FIG. 1.

Turning to FIG. 3 with reference to FIG. 1 continued, a description will be made as regards a writing operation for writing the state signal in the state indication area 20. It will be assumed that the monitoring unit 18 detects, at a first stage S'1 indicated by a cross, a failure in the diagnosing unit 15 and produces an abnormal state signal indicating that the diagnosing unit 15 is not capable of carrying out the diagnosing operation. The first stage S'1 is followed by second and third stages S'2 and S'3.

At the second stage S'2, the diagnosis control unit 19 controls retry of the diagnosing operation in response to the abnormal state signal.

At the third stage S'3, the diagnosis control unit 19 produces, in response to the abnormal state signal, a write request signal and delivers the write request signal together with the abnormal state signal to the main memory request controller 27 of the system controller 13 through a main memory access controller 30 of the diagnostic processor 14. The third stage S'3 is follows by a fourth stage S'4.

At the fourth stage S'4, the main memory request controller 27 supplies the write request signal and the abnormal state signal to the state indication area 20 of the main memory 10 to write the abnormal state signal in the state indication area 20 as the state indication signal. That is, the hexadecimal value "FF" is stored in the state indication area 20 instead of the hexadecimal value "00" as depicted along the top line.

At a fifth stage S'5 which follows the second stage S'2, the diagnosis control unit 19 of the diagnostic processor 14 finishes the retry of the diagnosing operation. In this event, the monitoring unit 18 of the diagnostic processor 14 produces a normal state signal indicating that the diagnosing unit 15 is capable of carrying out the diagnosing operation. When the diagnosis control unit 19 completes the retry of the diagnosing operation, the diagnosis control unit 19 produces first and second communication request signals each as either a retry end signal or a retry start/end signal to inform the control and arithmetic processors 11 and 12 about an end of the retry, respectively. The diagnosis control unit 19 delivers not only the first communication signal directed to the control processor 11 but also the normal state signal directed to the interprocessor communication controller 25 of the system controller 13 through the communication control unit 26 of the diagnostic processor 14. Simultaneously, the diagnosis control unit 19 delivers the second communication request signal directed to the arithmetic processor 12.

At a sixth stage S'6 which follows the fifth stage S'5, the interprocessor communication controller 25 of the system controller 13 supplies the first communication request signal and the normal state signal to the control processor 11, Simultaneously, the interprocessor communication controller 25 supplies the second communication request signal to the arithmetic processor 12. The control processor 11 receives the first communication request signal and the normal state signal and, thereby, knows the end of the retry of the diagnosing operation. When the arithmetic processor 12 receives the second communication request signal, the arithmetic processor 12 knows the end of the diagnosing operation.

At a seventh stage S'7 which follows the sixth stage S'6, the signal producing unit 21 of the control processor 11 receives the first communication request signal and the normal state signal through the communication control unit 24. In response to the first communication request signal, the signal producing unit 21 produces a write request signal and delivers the write request signal together with the normal state signal to the main memory request controller 27 of the system controller 13 through the main memory access controller 28 of the control processor 11. The seventh stage S'7 is followed by an eighth stage S'8.

At the eighth stage S'8, the main memory request controller 27 supplies the write request signal and the normal state signal to the state indication area 20 of the main memory 10 to write the normal state signal in the state indication area 20 as the state indication signal. That is, the hexadecimal value "00" is stored in the state indication area 20 instead of the hexadecimal value "FF" as depicted along the top line.

Figure 4:
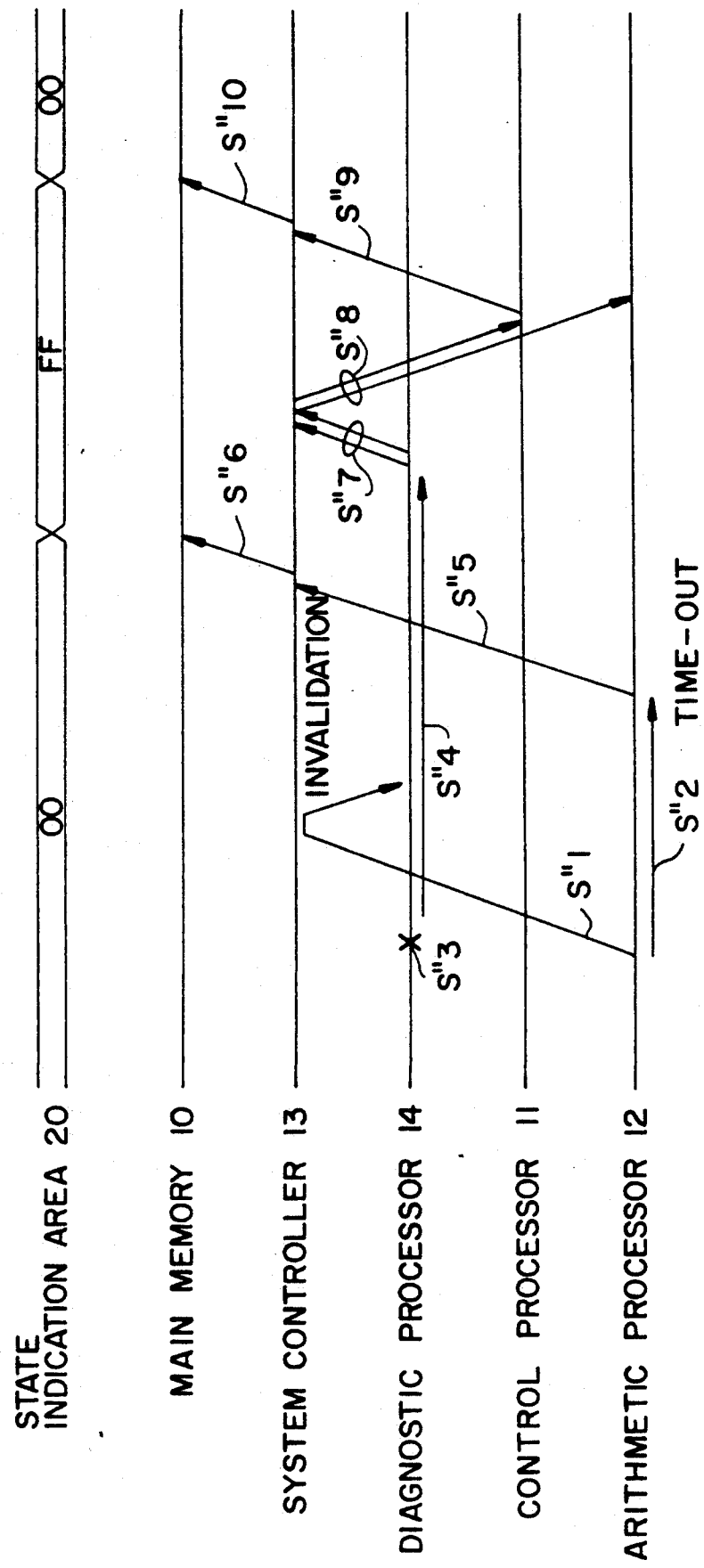
FIG. 4 is still another time chart for use in describing still another operation of the information processing system illustrated in FIG. 1.

Turning to FIG. 4 with reference to FIG. 1 continued, the description will proceed to another writing operation. It will be presumed that the signal producing unit 21 of the arithmetic processor 12 delivers a communication signal to the interprocessor communication controller 25 of the system controller 13 through the communication control unit 24 at a first stage S"1. The communication signal is directed to the diagnostic processor 14.

At a second stage S"2, a timer unit 40 of the arithmetic processor 12 starts a measuring operation for a predetermined time duration in response to the communication signal. The timer unit 40 produces a time-out signal when the timer unit 40 can not receive a reply communication signal from the diagnostic processor 14 within the predetermined time duration.

It will also be presumed that the monitoring unit 18 of the diagnostic processor 14 detects a failure in the diagnosing unit 15 immediately after the arithmetic processor 12 delivers the communication signal to the system controller 13 at a third stage S"3. The monitoring unit 18 thereby produces the abnormal state signal indicating that the diagnosing unit 15 is not capable of carrying out the diagnosing operation. The third stage S"3 is followed by a fourth stage S"4.

At the fourth stage S"4, the diagnosis control unit 19 of the diagnostic processor 14 controls retry of the diagnosing operation in response to the abnormal state signal. When the communication control unit 26 of the diagnostic processor 14 receives the communication signal through the interprocessor communication controller 25 during the fourth stage S"4, the communication control unit 26 makes the communication signal become invalid. More specifically, the diagnosis control unit 19 delivers an invalidation instruction signal to the communication control unit 26 while the diagnosis control unit 19 controls the retry of the diagnosing operation. In accordance with the invalidation instruction signal, the communication control unit 26 renders the communication signal invalid.

Attention will be directed to the second stage S"2. Inasmuch as the communication signal is not supplied to the diagnosing unit 15, the diagnostic processor 14 never produces the reply communication signal. Therefore, the timer unit 40 of the arithmetic processor 12 can not receive the reply communication signal within the predetermined time duration and produces the time-out signal at the second stage S"2. The second stage S"2 is succeeded by a fifth stage S"5.

At the fifth stage S"5, the signal producing unit 21 of the arithmetic processor 12 produces, in response to the time-out signal, a write request signal and the abnormal state signal and delivers the write request signal and the abnormal signal to the main memory request controller 27 of the system controller 13 through the main memory access controller 28 of the arithmetic processor 12.

At a sixth stage S"6 which follows the fifth stage S"5, the main memory request controller 27 supplies the write request signal and the abnormal state signal to the state indication area 20 of the main memory 10 to write the abnormal state signal in the state indication area 20 as the indication signal. That is, the hexadecimal value "FF" is stored in the state indication area 20 instead of the hexadecimal value "00" as depicted along the top line.

At a seventh stage S"7 which follows the second stage S"4, the diagnosis control unit 19 of the diagnostic processor 14 finishes the retry of the diagnosing operation. In this event, the monitoring unit 18 of the diagnostic processor 14 produces a normal state signal indicating that the diagnosing unit 15 is capable of carrying out the diagnosing operation. When the diagnosis control unit 19 completes the retry of the diagnosing operation, the diagnosis control unit 19 produces first and second communication request signals to inform the control and the arithmetic processors 11 and 12 about an end of the retry, respectively. The diagnosis control unit 19 delivers not only the first communication signal directed to the control processor 11 but also the normal state signal directed to the interprocessor communication controller 25 of the system controller 13 through the communication control unit 26 of the diagnostic processor 14. Simultaneously, the diagnosis control unit 19 delivers the second communication request signal directed to the arithmetic processor 12.

At an eighth stage S"8 which follows the seventh stage S"7, the interprocessor communication controller 25 of the system controller 13 supplies the first communication request signal and the normal state signal to the control processor 11. Simultaneously, the interprocessor communication controller 25 supplies the second communication request signal to the arithmetic processor 12. The control processor 11 receives the first communication request signal and the normal state signal and, thereby, knows the end of the retry of the diagnosing operation. When the arithmetic processor 12 receives the second communication request signal, the arithmetic processor 12 knows the end of the diagnosing operation.

At a ninth stage S"9 which follows the eighth stage S"8 for the control processor 11, the signal producing unit 21 of the control processor 11 receives the first communication request signal and the normal state signal through the communication control unit 24. In response to the first communication request signal, the signal producing unit 21 produces a write request signal and delivers the write request signal together with the normal state signal to the main memory request controller 27 of the system controller 13 through the main memory access controller 28 of the control processor 11. The ninth stage S"9 is followed by a tenth stage S"10.

At the tenth stage S"10, the main memory request controller 27 supplies the write request signal and the normal state signal to the state indication area 20 of the main memory 10 to write the normal state signal in the state indication area 20 as the state indication signal. That is, the hexadecimal value "00" is stored in the state indication area 20 instead of the hexadecimal value "FF" as depicted along the top line.

What is claimed is:

1. An information processing system comprising:
a main memory;
a standard processor;
a system controller; and
a diagnostic processor;
said diagnostic processor comprising
diagnosing means connected to said main memory, said standard processor, and said system controller for controlling a diagnosing operation for said main memory, said standard processor, and said system controller in response to an activation signal,
monitoring means connected to said diagnosing means for monitoring said diagnosing means for detecting failure in said diagnosing means, when said monitoring means does not detect said failure, for producing a state signal indicating that said diagnosing means is capable of controlling said diagnosing operation, and when said monitoring means detects said failure for making said state signal indicate that said diagnosing means is not capable of controlling said diagnosing operation, and
diagnosis control means connected to said diagnosing means and said monitoring means for controlling retry of said diagnosing operation in response to said state signal indicating that said diagnosing means is not capable of controlling said diagnosing operation;
said main memory comprising a state indication area connected to said monitoring means for storing said state signal as a state indication signal;
said standard processor comprising
signal producing means for producing a communication request signal and a read request signal, and
delivery control means connected to said signal producing means for receiving said communication request signal and for controlling delivery of said communication request signal as an output from said delivery control means;
said system controller comprising
communication request supply means connected to said diagnosing means and said delivery control means for supplying to said diagnosing means as said activation signal said communication request signal delivered from said delivery control means to said diagnosing means, and
read request supply means connected to said state indication area and said signal producing means for supplying said state indication area with said read request signal for receiving said state indication signal as a read-out state signal;

said standard processor further comprising judging means connected to said delivery control means and said read request supply means for judging said read-out state signal to produce first and second control signals when said diagnosing means is and is not capable of controlling said diagnosing operation, respectively, said judging means sending said first and said second control signals to said delivery control means to allow and inhibit delivery, respectively, of said communication request signal from said delivery control means to said communication request supply means.

2. The information processing system as claimed in claim 1, wherein:
said monitoring means produces as said state signal a normal state signal and an abnormal state signal when said monitoring means does not detect and detects said failure, respectively;
said state indication area storing normal and abnormal indication signals, each as said state indication signal, when supplied with said normal and said abnormal state signals together with a write request signal;
said signal producing means supplying said communication request signal to said communication request supply means through said delivery control means;
said read request supply means receiving said normal and abnormal indication signals as normal and abnormal read-out signals;
said judging means sending said first and said second control signals to said communication request supply means through said delivery control means when supplied with said normal and said abnormal read-out signals;
said delivery control means allowing and inhibiting in cooperation with said communication request supply means delivery of said communication request signal to said diagnosing means as said activation signal when supplied with said first and said second control signals, respectively;
said monitoring means sending said normal and said abnormal state signals when said monitoring means does not detect and detects said failure, respectively, in said diagnosing operation carried out by said diagnosing means in response to said activation signal;
said state indication area holding said normal indication signal and substituting said normal indication signal for said abnormal indication signal when supplied with said normal state signal together with said write request signal, said state indication area holding said abnormal indication signal and substituting said abnormal indication signal for said normal indication signal when supplied with said abnormal state signal together with said write request signal.

3. The information processing system as claimed in claim 2, wherein:
said diagnosis control means making said diagnosing means carry out said retry and sends said abnormal state signal to said state indication area when supplied with said abnormal state signal;
said monitoring means supplying said abnormal state signal and a retry start/end signal to said signal producing means through said diagnosis control means, said communication request supply means, and said delivery control means;

said signal producing means supplying said abnormal state signal and a write request signal to said read request supply means to store said abnormal state signal in said state indication area as said abnormal indication signal;

said monitoring means supplying said normal state signal and a retry end signal to said signal producing means when said retry is successful;

said signal producing means supplying said normal state signal and another write request signal to said read request supply means to substitute said normal indication signal for said abnormal indication signal.

4. The information processing system as claimed in claim 2, wherein:

said standard processor further comprises a timer unit connected to said signal producing means and said delivery control means for supplying a time-out signal to said signal producing means during a predetermined time duration after being supplied with said communication request signal unless a timer input signal is supplied from said delivery control means within said predetermined time duration;

said diagnosing processor further comprises a communication control unit connected to said diagnosis control means and said communication request supply means;

said signal producing means supplying said communication request signal to said communication control unit through said delivery control means and said communication request supply means;

said diagnosis control means making said diagnosing means carry out said retry and sending said abnormal state signal to said state indication area and an invalidation instruction signal to said communication control unit to invalidate said communication request signal when supplied with said abnormal state signal;

said signal producing means supplying a write request signal to said state indication area through said read request supply means if said retry lasts longer than said predetermined time duration to store said abnormal state signal in said state indication area as said abnormal indication signal;

said monitoring means supplying said normal state signal and a retry end signal to said signal producing means and said timer unit through said diagnosis control means, said communication control unit, said read communication supply means, and said delivery control means to make said timer unit cancel said time-out signal as said timer input signal and to make said signal producing means produce another write request signal when said retry comes to an end;

said signal producing means supplying said normal state signal and said write request signal to said state indication area through said read request supply means to store said normal state signal in said state indication area as said normal indication signal.

* * * * *